(12) United States Patent
Robinson

(10) Patent No.: US 7,040,264 B2
(45) Date of Patent: May 9, 2006

(54) TIMING ADVANCEMENT FOR EXHAUST VALVE IN INTERNAL COMBUSTION ENGINE

(76) Inventor: Barnett Joel Robinson, 227 California St., Newton, MA (US) 02458

(*) Notice: Subject to any disclaimer, the term of this patent is extended or adjusted under 35 U.S.C. 154(b) by 0 days.

(21) Appl. No.: 10/941,741

(22) Filed: Sep. 15, 2004

(65) Prior Publication Data

US 2006/0054119 A1   Mar. 16, 2006

(51) Int. Cl.
*F01L 1/34* (2006.01)
(52) U.S. Cl. ............................ 123/90.15; 123/90.16; 123/90.17
(58) Field of Classification Search ............. 123/90.15
See application file for complete search history.

(56) References Cited

U.S. PATENT DOCUMENTS

| | | | | |
|---|---|---|---|---|
| 3,703,164 A | * | 11/1972 | Weaving ................ | 123/568.11 |
| 4,205,634 A | * | 6/1980 | Tourtelot, Jr. ............ | 123/90.15 |
| 4,382,428 A | * | 5/1983 | Tourtelot, Jr. ............ | 123/90.16 |
| 4,438,737 A | * | 3/1984 | Burandt ................... | 123/90.17 |
| 4,805,571 A | * | 2/1989 | Humphrey ................. | 123/316 |
| 5,205,247 A | * | 4/1993 | Hoffman ................. | 123/90.16 |
| 6,601,563 B1 | * | 8/2003 | Funke et al. ................ | 123/321 |

* cited by examiner

*Primary Examiner*—Thomas Denion
*Assistant Examiner*—Kyle M. Riddle
(74) *Attorney, Agent, or Firm*—David M Warren

(57) ABSTRACT

An internal combustion engine having a timing device for advancing operation of an exhaust valve, and a method of operating the exhaust valve, wherein, for the case of a conventional automotive engine, the timing device opens the exhaust valve less than 90 degrees before bottom dead center in a terminal portion of the power stroke of the engine, but more than approximately 30 degrees before the bottom dead center. The engine is a four-stroke engine, and the open interval of the exhaust valve extends from a terminal portion of the power stroke into the exhaust stroke. The advancement in the opening of the exhaust valve reduces fuel consumption.

10 Claims, 3 Drawing Sheets

TIMING ADVANCEMENT FOR EXHAUST VALVE IN INTERNAL COMBUSTION ENGINE

BACKGROUND OF THE INVENTION

This invention relates to internal combustion engines and, more particularly, to the timing of an exhaust valve of an engine to promote efficiency of fuel consumption.

A form of the internal combustion engine, generally used for powering automobiles, operates in accordance with the Otto cycle, and may be referred to herein as a gasoline engine, as distinguished from a diesel engine. The gasoline engine, as well as the diesel engine, employs one or more cylinders, each cylinder having a piston movable along an axis of the cylinder with reciprocating motion, and being connected by a connecting rod to the engine crankshaft for driving the crankshaft with rotary motion. Output power of the engine for the driving of a load is obtained from the rotating crankshaft. In the case wherein the load is a vehicle driven by the engine, the engine crankshaft normally is connected via a transmission with selectable gear ratios to a propeller shaft of the vehicle for imparting rotation to the drive wheels of the vehicle.

In the four-stroke form of the gasoline engine, the movement of a piston in its cylinder is characterized by four strokes, which occur in a repeating sequence, the sequence of the four strokes being: an induction stroke, a compression stroke, a power (or expansion) stroke, and an exhaust stroke. During the induction stroke, the piston moves away from the head of the cylinder to produce a vacuum that draws in a mixture of air and fuel vapors via an intake valve generally located in the head of the cylinder. During the compression stroke, the piston moves towards the cylinder head to compress the air-fuel mixture. Approximately at the beginning of the power stroke, there is ignition of the air-fuel mixture and, during the power stroke, the expanding gases produced by the combustion of the fuel drive the piston away from the cylinder head. During the exhaust stroke, the piston moves towards the cylinder head to drive the exhaust gases out of the cylinder via an exhaust valve generally located in the cylinder head. In the usual construction of such an engine, an intake manifold is provided for bringing air and fuel from a carburetor or fuel-injection assembly to the intake ports of the cylinders, and an exhaust manifold is provided for removal of combustion gases via exhaust ports of the cylinders.

It is useful to compare operation of the gasoline engine with the diesel engine. In the case of the gasoline engine, both fuel and air are present in the cylinder during the compression stroke. The temperature produced in the gases within the cylinder is below the ignition temperature of the air-fuel mixture so as to avoid premature ignition of the air-fuel mixture. Ignition is produced by an electric spark of a spark plug, mounted within the cylinder head. In a modern engine, activation of the spark plug is provided by a computer at an optimum moment, relative to the time of occurrence of the power stroke. In the case of the diesel engine, only the air is present in the cylinder during the compression stroke. The geometry of the piston within the cylinder of the diesel engine differs somewhat from the corresponding geometry of the gasoline engine such that the compression stroke of the diesel engine provides significantly more compression of the gases within the cylinder (a compression ratio of approximately 15:1 to 20:1) than occurs in the gasoline engine (a compression ratio of approximately 8:1 to 10:1). As a result, in the diesel engine, the temperature of the air is raised by the compression stroke to a temperature high enough to ignite the fuel. Accordingly, in the diesel engine, the fuel is injected into the cylinder at approximately the beginning of the power stroke, and is ignited by the high air temperature.

It is observed furthermore, that in the usual construction of a gasoline engine and of a diesel engine, the ratio of the expansion of the volume of cylinder gases in the power stroke, namely the final volume divided by initial volume, is equal to the ratio of the compression of the volume of the cylinder gases in the compression stroke, namely the initial volume divided by final volume. The expansion of the cylinder gases in the power stroke is accompanied by a reduction in the temperature of the cylinder gases. Well-known theoretical considerations show that an important consideration in determining the efficiency of the engine is the ratio of the gas temperature at the beginning of the power stroke to the gas temperature at the end of the power stroke.

In spite of the foregoing theoretical considerations for the efficiency of a power stroke of the engine, there appears to be other factors in the operation of an engine that result in a needless wasting of the energy in the fuel with a resultant reduction in the fuel efficiency of the engine. In a test conducted by the present inventor in warm weather, an automobile powered by a gasoline engine was driven under speed control on the highway over a period of time, such as one minute, at an engine speed of 3000 RPM (revolutions per minute) corresponding to approximately 60 mph (miles per hour). The test was then conducted again by driving the automobile under a resumed speed control in the opposite direction of the highway so as to cancel out effects of any hills and the presence of any winds. The average amount of the fuel consumed was determined, which amount for illustrative purposes may be considered to be 200 cc (cubic centimeters). The vehicle was parked and the transmission put into "Park" gear, and the engine was "raced" with no load at the same engine speed of the highway driving at 3000 RPM. Again, the fuel consumption over the foregoing testing interval of one minute was measured, and determined to be 150 cc, only 25 percent less than the amount of fuel consumed under loading, namely the foregoing amount of 200 cc. The difference of only 25 percent shows that the major source of consumed fuel lies directly within the operation of the engine. Therefore there is a need for obtaining better fuel economy from an engine, and in view of the foregoing testing, it appears to be necessary to alter the engine itself in order to obtain improved fuel economy.

SUMMARY OF THE INVENTION

In accordance with the invention, it has been found that the withdrawal of the exhaust gases at the end of the power stroke of the engine provides a critical role in the improvement of engine efficiency, particularly with respect to the timing of the withdrawal of the exhaust gases in the interval of time extending from an end portion of the power stroke through an initial portion of the exhaust stroke. It is noted that in the conventional engine, wherein the exhaust valve is opened by a cam on a camshaft, the valve is opened gradually from a state of full closure to a state of complete opening and then closed gradually from a state of full open to a state of full closure. The total time for this opening and closing of the exhaust valve—assuming 180° of crankshaft rotation for this opening and closing process is between 6 milliseconds at 4,800 RPM and 36 milliseconds at 800 RPM. However, it takes only the first 1 to 3 milliseconds of that opening and closing process for the pressure of the gases to be removed from the piston. In order to provide a reference point for the beginning of the opening interval of the exhaust valve, the starting point for the opening interval is taken at the instant when the exhaust valve has risen 0.050 inches from the valve seat.

With respect to the matter of advancing the inception of the exhaust interval, in the conventional engine, intended to operate most often at a rate of rotation of 1500 to 4500 RPM, the opening of the exhaust interval is advanced in time, so as to occur prior to bottom dead center by 1 to 3 milliseconds, this being accomplished by timing the opening of the exhaust valve to begin at a crankshaft angle of approximately 30 degrees prior to bottom dead center. The intent of the advancement of the exhaust interval, in the conventional engine, has been to maximize power output of the engine by removal of a significant part of the exhaust gases prior to the exhaust stroke so that engine power need not be wasted by having the piston push more than a minimal amount of the exhaust gases out through the exhaust valve during the exhaust stroke. For ease of reference, this advancement interval at the end portion of the power stroke may be referred to hereinafter as the power advancement interval. In the case of a conventional engine intended to operate at a higher crankshaft rotation rate, such as a rate of rotation of 8000 RPM in a racing engine, the opening of the exhaust valve at the inception of the exhaust interval may be as early as approximately 70 degrees before bottom dead center to provide a suitable interval of time for exhausting the exhaust gases by the time the piston reaches bottom dead center. Here too, in the case of the racing engine, the intent of the advancement of the exhaust interval is to eliminate any gas pressure on the piston when the exhaust stroke begins.

In accordance with the invention, it has been discovered that still further advancement of the exhaust interval relative to bottom dead center has the effect of improving the engine efficiency, this being an unexpected result. In the case of too much advancement of the exhaust interval relative to bottom dead center, so much energy of the burned fuel is lost that there is little torque available for driving the vehicle, and there is no improvement in the engine efficiency.

For example, in a test for the driving of a car over a prescribed course at 60 miles per hour under speed control in warm weather by an engine having a camshaft modified to provide for the advancement of the opening of the exhaust valve at a crankshaft angle of 90 degrees before bottom dead center, it was observed that the fuel consumption was the same (7.0 gallons in the test vehicle) as in a car having a conventional camshaft with advancement by 30 degrees before bottom dead center. However, the car with the modified camshaft had greatly reduced available torque such that a long time was required to accelerate to a reasonable vehicular speed. Other tests, conducted with camshafts providing advancement of 50 degrees and 70 degrees before bottom dead center provided a 17 percent improvement in miles per gallon with equal values of fuel consumption (6.0 gallons in the test vehicle). Optimum efficiency appears to occur for advancement at a crankshaft angle of approximately 60 degrees prior to bottom dead center, at highway speed in a test vehicle having over-drive transmission. This situation provided minimal consumption of fuel (5.5 gallons) while providing all the necessary torque for driving the vehicle. Thus, utilization of the present invention provided a 27 percent improvement in fuel efficiency over a conventional vehicle having a camshaft advancing the exhaust-valve opening by 30 additional degrees of crankshaft rotation.

The benefits of the invention are believed to apply both to a gasoline engine and to a diesel engine. In theory, the improvement to a diesel engine should be larger than the improvement to a gasoline engine since the gas pressure to be released on the piston is greater in a diesel engine than in a gasoline engine. Operation of the exhaust valve may be by a valve-driving device that is mechanical (as with the aforementioned camshaft), hydraulic or electromagnetic. In engines wherein the valve timing is adjustable by a computer, the timing of the exhaust valve advancement may be adjusted in accordance with engine speed and load so as to obtain improved fuel efficiency while minimizing power loss.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
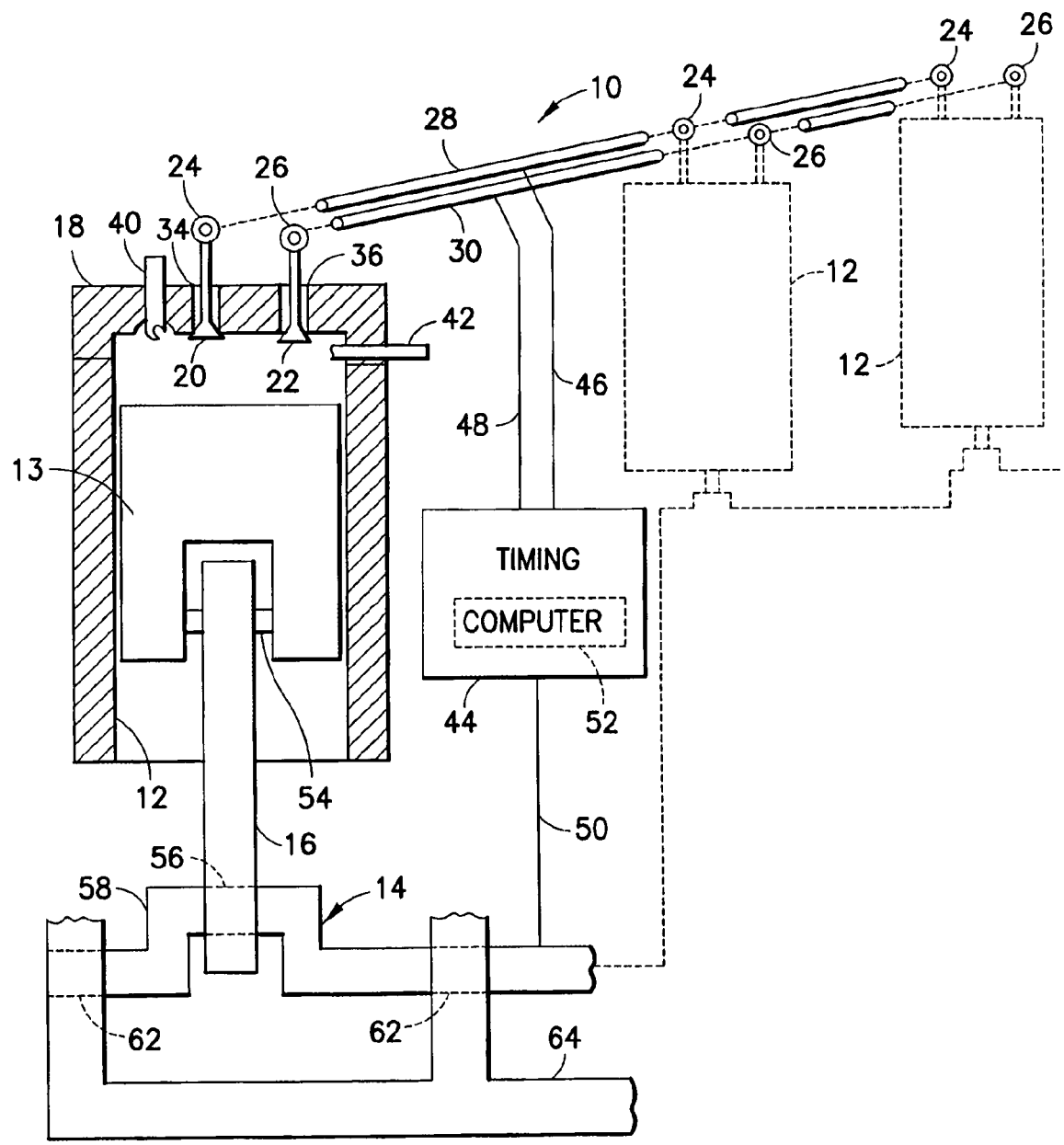
FIG. 1 shows a stylized view of an internal combustion engine constructed in accordance with the invention.

FIG. 1 shows a diagrammatic view of an engine 10 having a plurality of cylinders 12 with pistons 13 therein. One of the cylinders 12 is sectioned to show its piston 13, and the remaining cylinders 12 are shown in phantom view. With respect to an individual one of the cylinders 12, the piston 13 is driven by a crankshaft 14 of the engine 10, and connects by a connecting rod 16 with the crankshaft 14 for reciprocating motion of the piston 13 during rotation of the crankshaft 14. Motion of the piston 13 is characterized by a repeating sequence of four strokes, as described above. During the induction stroke and during the power (or expansion) stroke, the distance between the piston 13 and a head 18 of the cylinder 12 increases to provide for an increase in the volume of cylinder available for containing gases within the cylinder. During the compression stroke and during the exhaust stroke, the distance between the piston 13 and the head 18 decreases to provide for a decrease in the volume of the cylinder available for the containment of gases within the cylinder. Typically, in the construction of the cylinder head 18, the interior of the head 18 may be provided with a complex shape to enhance combustion within the cylinder 12; however, for an understanding of the present invention, the interior of the cylinder head 18 may be represented by the more simple shape of a right circular cylinder as shown in FIG. 1.

The engine 10 further comprises an intake valve 20, and an exhaust valve 22 located in the cylinder head 18, these two valves being present in both the gasoline and the diesel forms of the engine 10. The valves 20 and 22 are operated, respectively, by cams 24 and 26 of camshafts 28 and 30. It is understood that the two camshafts are provided by way of example, and that, by way of further example, a single camshaft with two cams thereon may be employed for operation of the foregoing valves. The intake valve 20 is operative to close and to open an intake port 34 of the head 18. The exhaust valve 22 is operative to close and to open an exhaust port 36 of the head 18. Also shown in FIG. 1 is a spark plug 40 for ignition of gases in the cylinder 12 in the case of the gasoline engine and, as an alternative form of construction, FIG. 1 also shows a fuel injector 42 for injecting fuel into the heated air of the cylinder 12 at the beginning of the power stroke for the case of the diesel engine.

The engine 10 also includes a timing device 44 for synchronizing rotation of the crankshaft 14 with rotations of the camshafts 28 and 30. Lines 46 and 48 represent, respectively, connections of the timing device 44 to the camshafts 28 and 30. Line 50 represents connection of the timing device 44 to the crankshaft 14. In the practice of the invention, the driving of the valve 20 and the valve 22 may be accomplished by well-known mechanical, hydraulic or electromagnetic apparatus synchronized to the crankshaft 14, which apparatus is represented diagrammatically by the camshafts 28 and 30 and the timing device 44. By way of example, in the case of a mechanical driving of the valves 20 and 22, the timing device 44 with its connecting lines 46, 48 and 50 may be provided by means of gearing and a timing belt (not shown) which interconnects gears on the crankshaft 14 and on the camshafts 28 and 30 to provide desired rates of rotation and timing of the rotations of the camshafts 28 and 30 relative to the rotation of the crankshaft 14.

By way of further example, in the case of an electromagnetic driving of the valves 20 and 22, the timing device 44 may be provided with a computer 52, the line 50 represents a shaft angle encoder providing instantaneous values of the angle of the crankshaft 14 to the computer 52, and the lines 46 and 48 represent electric motors for rotating the camshafts 28 and 30 in response to drive signals provided by the computer 52. The computer 52 may include a read-only memory storing optimum camshaft angles for opening and closing both the intake valve 20 and the exhaust valve 22 as a function of various engine operating conditions such as crankshaft angle and rate of rotation, as well as possibly intake air mass flow rate and accelerator pedal position, by way of example. Based on data stored in the memory as well as data provided to the computer 52 by engine sensors, as are well-known, the computer 52 outputs the drive signals to the electric motors for rotating the camshafts 28 and 30, thereby to operate the valves 20 and 22 at the optimum times, respectively, for accomplishing the induction and the exhaust functions. Information stored in the memory of the computer 52, with respect to the optimum timing of each of the valves 20 and 22, may be obtained by experimentation. The functions provided by the computer 52 may be provided by the engine-control computer found in a modern-day engine, which computer may be provided, in accordance with the invention, with programming designed to optimize the timing of the operation of the exhaust valve 22 for best fuel efficiency of the engine.

Figure 2:
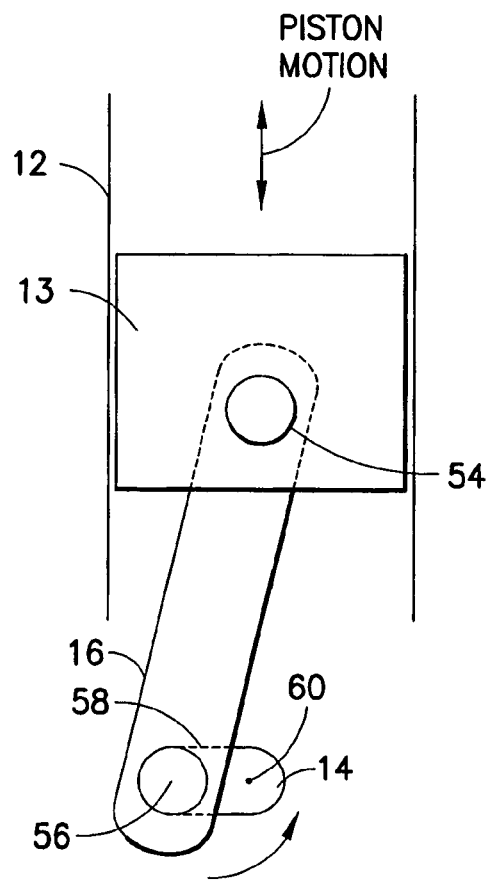
FIG. 2 shows diagrammatically the connection of a piston to a section of crankshaft in a viewing direction along an axis of the crankshaft.

With reference also to FIG. 2, which presents a fragmentary view of the engine 10 taken in a direction parallel to an axis of the crankshaft 14, connection of the piston 13 to the connecting rod 16 is made by way of a pin 54 that enables the connecting rod 16 to pivot relative to the piston 13. The opposite end of the connecting rod 16 connects with the crankshaft 14 via a journal 56 located in a crank arm 58 of the crankshaft 14, the journal 56 permitting the crankshaft 14 to rotate about its axis 60 relative to the connecting rod 16. The crankshaft 14 is supported by a set of bearings 62, two of which are shown in FIG. 1, located in a housing 64 of the engine 10. The bearings 62 enable the crankshaft 14 to rotate relative to the housing 64.

Figure 3:
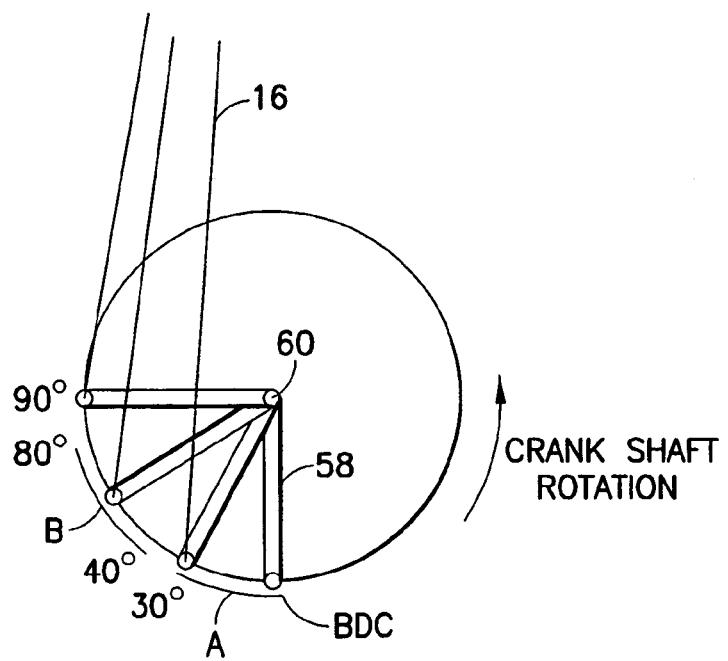
FIG. 3 is a diagram showing positions of a crankshaft for different values of torque produced by piston forces on a connecting rod.

In FIG. 3, the schematic representation of the connecting rod 16 and the crank arm 58 corresponds to the presentation of FIG. 2, and shows various positions of the crank arm 58 assumed prior to the reaching of bottom dead center. Four positions of the crank arm 58 are shown, namely, BDC, 30 degrees before BDC, 60 degrees before BDC, and 90 degrees before BDC.

Figure 4:
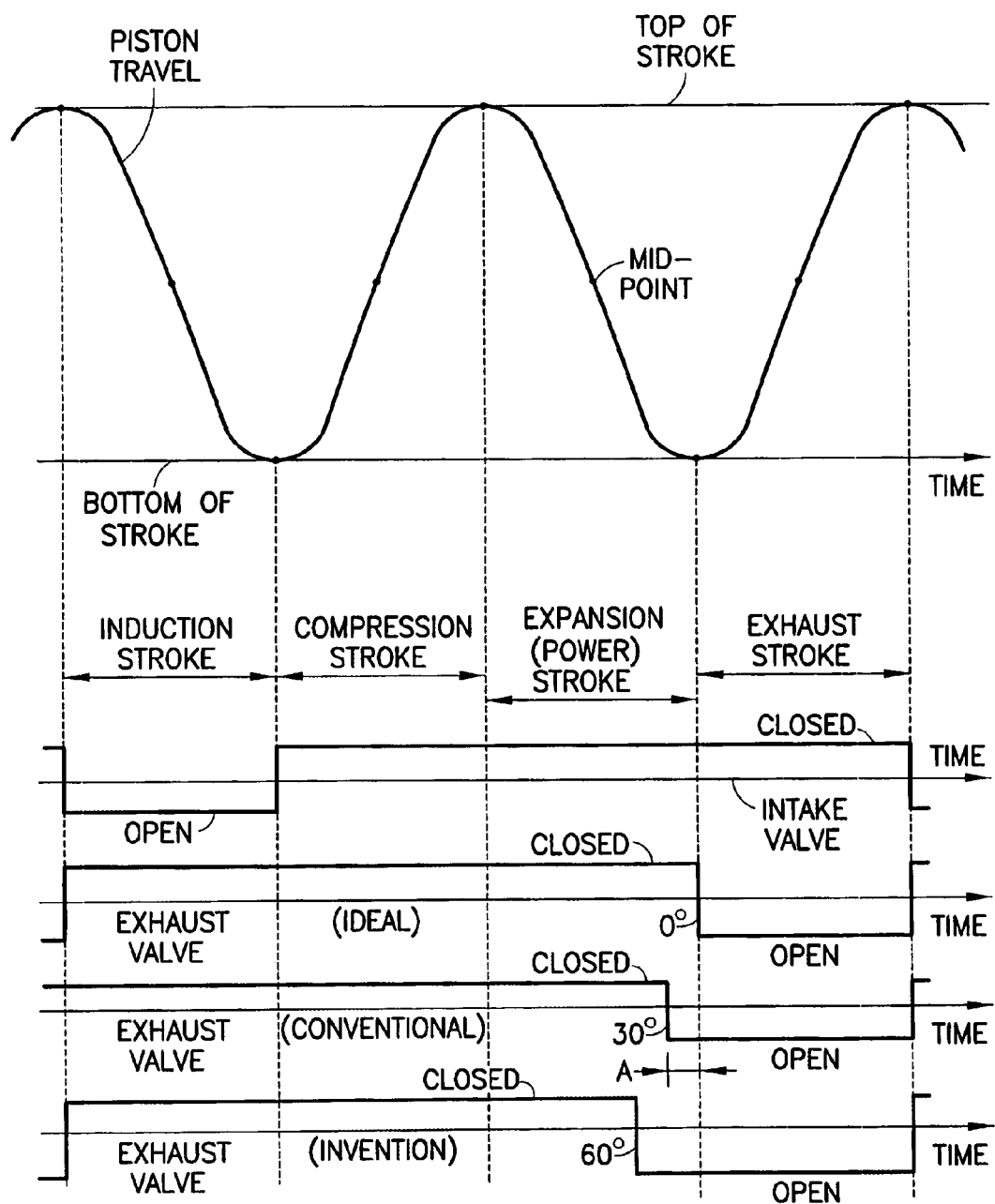
FIG. 4 is a timing diagram showing operation of valves and a piston associated with a cylinder of the engine.

FIG. 4 presents a timing diagram showing the various strokes of the piston travel with the reciprocating motion in the cylinder. Also shown are the open and closed positions of the valves with reference to the piston travel. Five graphs are presented, each graph having a horizontal axis representing the time. In the first graph at the top of the diagram, the piston travel is shown as a sinusoidal movement between the top of the stroke and the bottom of the stroke, identified in the figure. The midpoint of a stroke is also identified. The successive strokes are identified as: (1) the induction stroke wherein the piston travels from the top dead center position, adjacent the cylinder head, to the bottom dead center position; (2) the compression stroke wherein the piston travels from the bottom dead center position to the top dead center position; (3) the expansion (or power) stroke wherein the piston travels from the top dead center position to the bottom dead center position; and (4) the exhaust stroke wherein the piston travels from the bottom dead center position to the top dead center position.

The second graph shows that the intake valve is open during the induction stroke and closed during the other three strokes. The next three graphs show operation of the exhaust valve for three separate situations. The first of the exhaust graphs depicts an ideal situation wherein the crankshaft is rotating very slowly relative to the time required for exhausting the gases, in which case the exhaust valve is open during the exhaust stroke and closed during the other three strokes. The second of the exhaust graphs depicts the situation for conventional engine design, generally found in engines for automobiles, wherein the exhaust valve is opened before the conclusion of the power stroke by an interval (the power advancement interval) identified as A in FIGS. 3 and 4. In the case of the conventional engine operation depicted in FIG. 4, for the power advancement interval A, the opening of the exhaust valve is advanced by approximately 30 degrees prior to bottom dead center in the rotation of the crankshaft.

The third of the exhaust graphs depicts the situation for implementation of the present invention in gasoline and diesel engines suitable for use in an automobile wherein the opening of the exhaust valve occurs before the conclusion of the power stroke by advancement of the opening of the exhaust valve by 60 degrees prior to bottom dead center. This is 30 degrees prior to the power advancement interval A in the rotation of the crankshaft. After the opening of the exhaust valve at the aforementioned 60 degrees prior to bottom dead center, the exhaust valve remains open during the remainder of the power stroke and into the period of the exhaust stroke.

In the practice of the invention, it is understood that the advancement of the exhaust-valve opening, shown as the 60 degrees presented in the last graph of FIG. 4, is a fixed amount provided in one embodiment of the invention wherein the engine has a relatively simple design such that the advancement is fixed for all values of rotational speed of the crankshaft. However, in accordance with a second embodiment of the invention, wherein the invention is implemented in an engine having a variable timing capability, the advancement in the time of the opening of the exhaust valve could be varied in accordance with the rotational speed of the crankshaft and the load on the engine. For example, at an engine speed of 1500 RPM, the advancement in the exhaust-valve opening could be less than 60 degrees prior to bottom dead center, and at an engine speed of 4500 RPM, the advancement in the exhaust-valve opening could be greater than 60 degrees prior to bottom dead center. It is a function of how many degrees of crankshaft rotation it takes to release the gas pressure on the piston.

It is understood that the foregoing values of advance as a function of engine speed are given by way of example, and that more accurate values are obtained by experimentation with a specific form of engine to be evaluated. Thus, in accordance with the second embodiment of the invention, a range of values of advancement of the exhaust-valve opening, namely a range of 40 to 80 degrees of crankshaft angle indicated at B in FIG. 3, provides for more efficient operation of the engine over a range of engine speeds, 1500–4500 RPM, generally used in the driving of an automobile. After the opening of the exhaust valve at the value of advance in the aforementioned range of 40 to 80 degrees prior to bottom dead center, the exhaust valve remains open during the remainder of the power stroke and into the period of the exhaust stroke. It is also understood that an engine may be constructed with variable timing such that the magnitude of the power advancement interval A may be adjusted by a computer as a function of driving conditions, and possibly as a function of engine speed. With such an engine, the invention may be practiced, but with the foregoing values in the range of advancement B being adjusted to precede the power advancement interval A. Both embodiments of the invention provide for reduced fuel consumption with improved efficiency of the engine.

With reference to FIG. 3, while the range B is shown encompassing advancement values of 40 to 80 degrees, it is understood that the range may be extended somewhat to both larger and smaller values of the advance. For example, at an advance of 85 degrees, it is believed that there would be an improvement in efficiency, but that this improvement would be smaller than the improvement at the advance of 70 degrees during normal driving conditions. Similarly, at an advance of 35 degrees, it is believed that there would be an improvement in efficiency, but that this improvement would be smaller than the improvement at the advance of 50 degrees except for very low engine speed.

It is observed that at the 90 degrees advance, the crank arm 58 is approximately perpendicular to the connecting rod 16. Thus, the piston force is delivering maximum torque to the crankshaft 14. At the 60 degrees advance, the crank arm 58 is inclined somewhat to the connecting rod 16 for a reduction in torque, and also the further travel of the piston 13 provides for a reduction in the force of the burnt gases, this resulting in a still further diminution of the torque. By use of the same reasoning, the torque is much smaller at the 30 degrees advance, and drops to zero at bottom dead center at which position the crank arm 58 is oriented parallel to the connecting rod 16. Therefore, it is believed that any benefit, in terms of fuel consumption, in an extension of the advance range B close to the 90 degrees advance would be negated by the loss of engine power in the vicinity of maximum torque. This is consistent with the aforementioned test results wherein the fuel consumption, in the cases of the exhaust-valve opening at the 30 degrees advance and at the 90 degrees advance, was found to be the same.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An internal combustion engine comprising:
   a cylinder, a crankshaft, and a piston connected by a connecting rod to the crankshaft and being movable with reciprocating motion within the cylinder upon rotation of the crankshaft, the piston motion providing a succession of four strokes including an induction stroke, a compression stroke, a power stroke and an exhaust stroke;
   an intake valve and an exhaust valve located in the cylinder, wherein the intake valve serves to admit gas during the induction stroke into the cylinder, and the compression stroke serves to compress a quantity of the gas within the cylinder in preparation for the power stroke, the gas being a mixture of air and fuel in the case of a gasoline engine, and air without fuel in the case of a diesel engine;
   a timing device synchronized with rotation of the crankshaft for operating the exhaust valve to provide for an interval of closure of the exhaust valve and an open interval of the exhaust valve, an opening of the exhaust valve permitting an exhausting of exhaust gas from the cylinder, wherein the open interval of the exhaust valve extends over a terminal portion of the power stroke and into the exhaust stroke, and wherein a starting point for the opening interval of the exhaust valve is taken at the instant when the exhaust valve has risen 0.050 inches from the valve seat; and
   wherein the timing device is operative to advance an opening of the exhaust valve prior to a power advancement interval in the terminal portion of the power stroke; and
   wherein an advancing of the timing of the opening of the exhaust valve to coincide with the power advancement interval provides for a maximum power output capability of the engine with a reduced value of efficiency of the engine, and the opening of the exhaust valve prior to the power advancement interval provides for an increased value of the efficiency and a reduced value of the power output capability of the engine.

2. An engine according to claim 1 wherein the opening of the exhaust valve is advanced before the power advancement interval by at least 10 degrees of rotation of the crankshaft.

3. An engine according to claim 1 wherein the opening of the exhaust valve is advanced before the power advancement interval over a range of time corresponding to a range of 10 to 50 degrees of rotation of the crankshaft.

4. An engine according to claim 3 wherein the opening of the exhaust valve occurs in an interval of time corresponding to a range of 40 to 80 degrees of crankshaft rotation prior to bottom dead center at the end of the power stroke.

5. An engine according to claim 1 wherein the opening of the exhaust valve occurs in an interval of time prior to the power advancement interval, and corresponding to a range of 40 to 80 degrees of crankshaft rotation prior to bottom dead center at the end of the power stroke.

6. A method of improving fuel efficiency in an internal combustion engine, wherein the engine comprises:

a cylinder, a crankshaft, and a piston connected by a connecting rod to the crankshaft and being movable with reciprocating motion within the cylinder upon rotation of the crankshaft, the piston motion providing a succession of four strokes including an induction stroke, a compression stroke, a power stroke and an exhaust stroke;

an intake valve and an exhaust valve located in the cylinder, wherein the intake valve serves to admit gas during the induction stroke into the cylinder, and the compression stroke serves to compress a quantity of the gas within the cylinder in preparation for the power stroke, the gas being a mixture of air and fuel in the case of a gasoline engine, and air without fuel in the case of a diesel engine; and a timing device synchronized with rotation of the crankshaft for operating the exhaust valve to provide for an interval of closure of the exhaust valve and an open interval of the exhaust valve, an opening of the exhaust valve permitting an exhausting of exhaust gas from the cylinder;

wherein the method comprises the steps of:

allowing the open interval of the exhaust valve to extend over a terminal portion of the power stroke and into the exhaust stroke, and wherein a starting point for the opening interval of the exhaust valve is taken at the instant when the exhaust valve has risen 0.050 inches from the valve seat; and operating the timing device to advance an opening of the exhaust valve prior to a power advancement interval in the terminal portion of the power stroke; wherein an advancing of the timing of the opening of the exhaust valve to coincide with the power advancement interval provides for a maximum power output capability of the engine with a reduced value of efficiency of the engine, and the opening of the exhaust valve prior to the power advancement interval provides for an increased value of the efficiency and a reduced value of the power output capability of the engine.

7. A method according to claim 6 wherein the opening of the exhaust valve is advanced before the power advancement interval by at least 10 degrees of rotation of the crankshaft.

8. A method according to claim 6 wherein the opening of the exhaust valve is advanced before the power advancement interval over a range of time corresponding to a range of 10 to 50 degrees of rotation of the crankshaft.

9. A method according to claim 8 wherein the opening of the exhaust valve occurs in an interval of time corresponding to a range of 40 to 80 degrees of crankshaft rotation prior to bottom dead center at the end of the power stroke.

10. A method according to claim 6 wherein the opening of the exhaust valve occurs in an interval of time prior to the power advancement interval, and corresponding to a range of 40 to 80 degrees of crankshaft rotation prior to bottom dead center at the end of the power stroke.

* * * * *